United States Patent
Cai et al.

(10) Patent No.: US 9,317,400 B2
(45) Date of Patent: Apr. 19, 2016

(54) CODE COVERAGE RATE DETERMINATION METHOD AND SYSTEM

(71) Applicant: Alibaba Group Holding Limited, George Town (KY)

(72) Inventors: Hua Cai, Hangzhou (CN); Qi Zhou, Hangzhou (CN); Tingtao Sun, Hangzhou (CN)

(73) Assignee: Alibaba Group Holding Limited (KY)

( * ) Notice: Subject to any disclaimer, the term of this patent is extended or adjusted under 35 U.S.C. 154(b) by 307 days.

(21) Appl. No.: 13/763,497

(22) Filed: Feb. 8, 2013

(65) Prior Publication Data

US 2013/0212564 A1 Aug. 15, 2013

(30) Foreign Application Priority Data

Feb. 14, 2012 (CN) .......................... 2012 1 0033077

(51) Int. Cl.
*G06F 9/44* (2006.01)
*G06F 11/36* (2006.01)

(52) U.S. Cl.
CPC .................................. *G06F 11/3676* (2013.01)

(58) Field of Classification Search
None
See application file for complete search history.

(56) References Cited

U.S. PATENT DOCUMENTS

| | | | |
|---|---|---|---|
| 5,758,061 A * | 5/1998 | Plum ................................ | 714/35 |
| 7,503,037 B2 * | 3/2009 | Banerjee et al. ............... | 717/124 |
| 7,617,415 B1 | 11/2009 | Kadakia | |
| 7,861,226 B1 * | 12/2010 | Episkopos et al. ............ | 717/124 |
| 7,971,189 B2 | 6/2011 | Drake | |
| 2003/0093252 A1 * | 5/2003 | Frankel et al. .................. | 703/13 |
| 2006/0294503 A1 * | 12/2006 | Henderson et al. ............ | 717/131 |
| 2009/0049428 A1 * | 2/2009 | Cozmei .......................... | 717/128 |
| 2009/0089761 A1 * | 4/2009 | Lazzaro et al. ............... | 717/128 |
| 2011/0307865 A1 * | 12/2011 | Grieves et al. ................ | 717/124 |

(Continued)

FOREIGN PATENT DOCUMENTS

| | | |
|---|---|---|
| CN | 1704908 | 12/2005 |
| JP | 2000267888 | 9/2000 |

(Continued)

OTHER PUBLICATIONS

Gittens et al., "All Code Coverage Is Not Created Equal: A Case Study in Prioritized Code Coverage", ACM, 2006.

(Continued)

*Primary Examiner* — Jason Mitchell
*Assistant Examiner* — Christine Dang
(74) *Attorney, Agent, or Firm* — Van Pelt, Yi & James LLP

(57) ABSTRACT

Embodiments of the present application relate to a code coverage rate determination method, a code coverage rate determination system, and a computer program product for determining code coverage rate. A code coverage rate determination method is provided. The method includes retrieving source code of a program, determining theoretical number of log file output points included in the source code and location information of the log file output points, retrieving log files actually outputted during the execution of the program, determining an actual number of log file output points of the actual outputted log files based on the location information of the corresponding log file output points recorded in each log file, and determining a code coverage rate of the program based on the theoretical number of log file output points and the actual number of the log file output points of the actual outputted log files.

10 Claims, 12 Drawing Sheets

(56) References Cited

U.S. PATENT DOCUMENTS

2012/0167059 A1* 6/2012 Kosuda .................. 717/131
2012/0246624 A1  9/2012 Halliday et al.
2012/0291017 A1  11/2012 Fuhrer et al.

FOREIGN PATENT DOCUMENTS

JP   2006146669   6/2006
JP   2010026749   2/2010

OTHER PUBLICATIONS

Horgan et al., "Achieving software quality with testing coverage measures", IEEE, vol. 27, No. 9, Sep. 1, 1994, pp. 60-69.

Su et al. "Application of code coverage analytical tools in the testing of embedded software", Microcontrollers and Embedded Systems, Issue 5, May 31, 2007, pp. 9-11.

Xu et al. "Log function design for control system software", Marine Electric and Electronic Engineering—Control Technology, vol. 31, Issue 7, Jul. 31, 2011, pp. 8-12.

* cited by examiner

400

540

700

CODE COVERAGE RATE DETERMINATION METHOD AND SYSTEM

CROSS REFERENCE TO OTHER APPLICATIONS

This application claims priority to People's Republic of China Patent Application No. 201210033077.X entitled CODE COVERAGE RATE DETERMINATION METHOD AND SYSTEM AND CODE COVERAGE DETECTION METHOD AND SYSTEM, filed Feb. 14, 2012 which is incorporated herein by reference for all purposes.

FIELD OF INVENTION

The present application relates to a code coverage rate determination method and system.

BACKGROUND OF THE INVENTION

In a computer program testing process, code coverage rate is an indicator used to assess program code coverage. The code coverage rate measures the extent a source code is used during testing. Statistics relating to the code coverage rate enables one to understanding how much of the code in a program has been executed and helps determine where the code coverage is insufficient to thereby discover potential problems with the program.

One code coverage rate determination method includes tagging runtime situations of code to be tested, take a final count of the quantity of run code executed based on the number of tags encountered, and determine the code coverage rate by comparing the quantity of run code based on the quantity of tags encountered against the total quantity of code. For example, the method comprises: determining a total quantity of code in a program to be tested, a base address of the program to be tested, and a relative virtual address of each line of code of the program; setting up break points in each line of code based on the base address and the relative virtual address; determining whether a break point occurs in the execution of the program to be tested; and tagging the line of code in which the break point has occurred. Finally, the cumulative total of tagged lines of code is used to obtain the total quantity of executed code. The total quantity of executed code divided by the total quantity of code of the program to be tested is the code coverage rate.

Another method comprises: before a testing process begins, revising a source code and configuration of the program to be tested by adding test information output settings to the source code for which a code coverage rate is to be determined; during the testing process, internally recording tags output by the source code that has been tested based on the test information output settings added into the source code; and upon conclusion of the testing process, retrieving the source code that has been executed based on the tags, and comparing a quantity of source code executed based on the number of tags output with the total quantity of source code to obtain the code coverage rate.

The methods described above all add tags to the source code in advance to determine the code coverage rate. When the volume of source code is very large, the above methods generate a large amount of processing, which affects the testing time. Also, because the above methods require processing of the source code, the above code coverage rate determination methods only apply to the testing stage of a program and cannot be implemented during the actual execution of the program.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
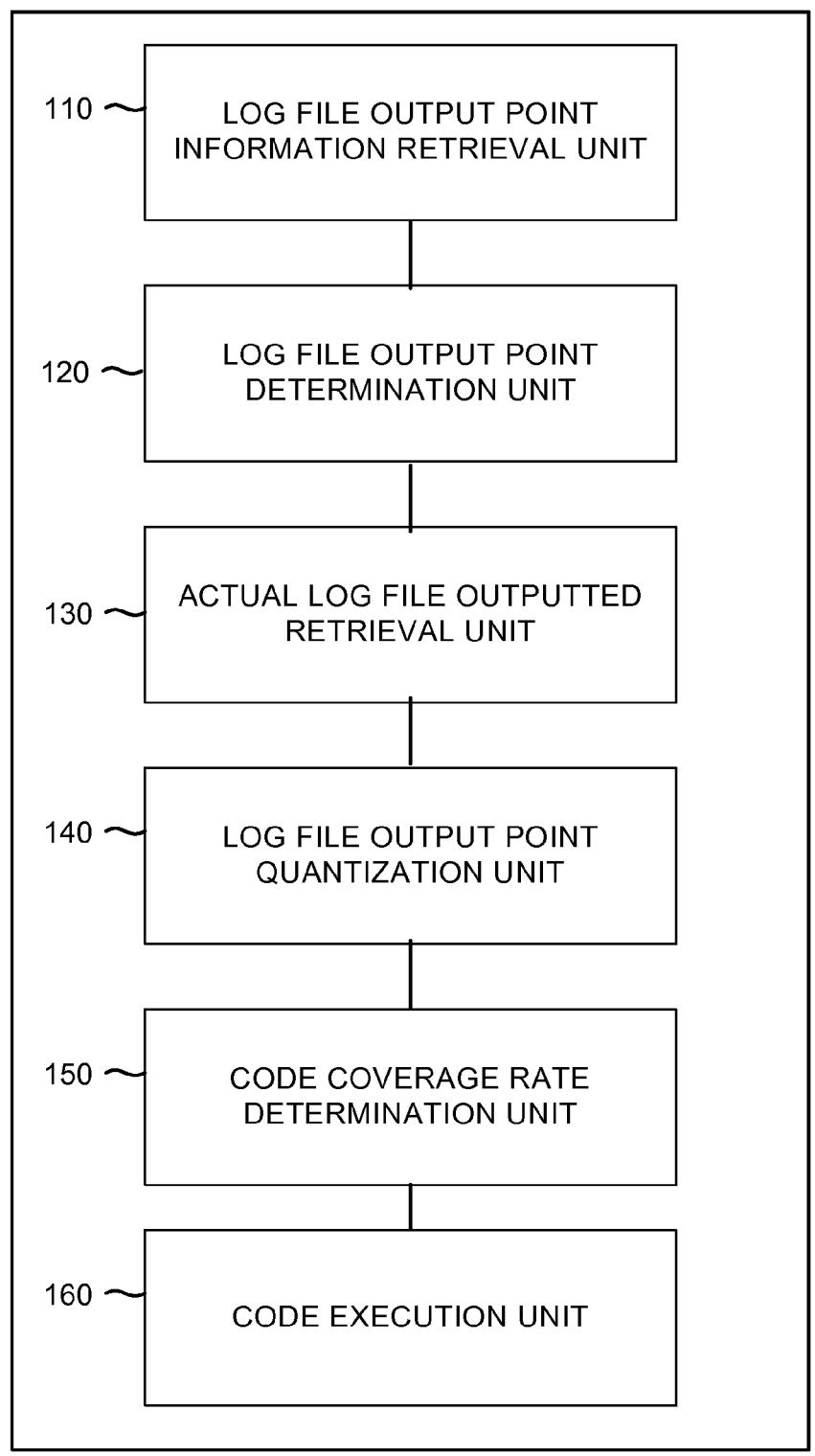
FIG. 1 is a schematic diagram illustrating an embodiment of a code coverage detection system.

FIG. 1 is a schematic diagram illustrating an embodiment of a code coverage detection system. The system 100 includes a log file output point information retrieval unit 110, a log file output point determination unit 120, an actual log file outputted retrieval unit 130, a log file output point quantization unit 140, a code coverage rate determination unit 150, and a code execution unit 160.

The log file output point information retrieval unit 110 is configured to retrieve source code of a program.

The log file output point determination unit 120 is configured to determine theoretical number and location information of log file output points included in the source code. Details of the determination are described below in connection with FIG. 4.

The actual log file outputted retrieval unit 130 is configured to retrieve log files actually outputted during the execution of the program.

The log file output point quantization unit 140 is configured to determine a number of log file output points of the actual outputted log files based on the location information of the corresponding log file output points recorded in each log file. In one example, the log file output point quantization unit 140 optionally includes a reading element or a receiving element. The reading element is configured to read the log files outputted by the program from a predetermined storage location. The storage location can be predetermined by the program. The receiving element is configured to receive log files transmitted by the program from a predetermined interface. The predetermined interface can be predetermined by the program.

Programmers often use log files to record information about programs' operation. As used herein, a log file output point refers to a point in the program where a log is outputted. The log file output point can indicate a time, an error level (e.g., fatal, error, warning, info, debug, etc.), and log information related to a corresponding source code's position (e.g., file, line number, etc.). For example, a log that is output at a log file output point can include information relating to the program's operations such as information regarding the operating environment, and can have a log level such as a warning.

As a result, a log program in an online system can automatically open and store for a period of time the output of the program, and can obtain log file information in various runtime environments easier. In some embodiments, the period of time can be set to several days. The code coverage rate determination unit 150 is configured to obtain the code coverage rate of the program based on the theoretical number of log file output points included in the source code and the number of log file output points of the actual outputted log files.

The code execution unit 160 is configured to compile and execute the source code.

Figure 2A:
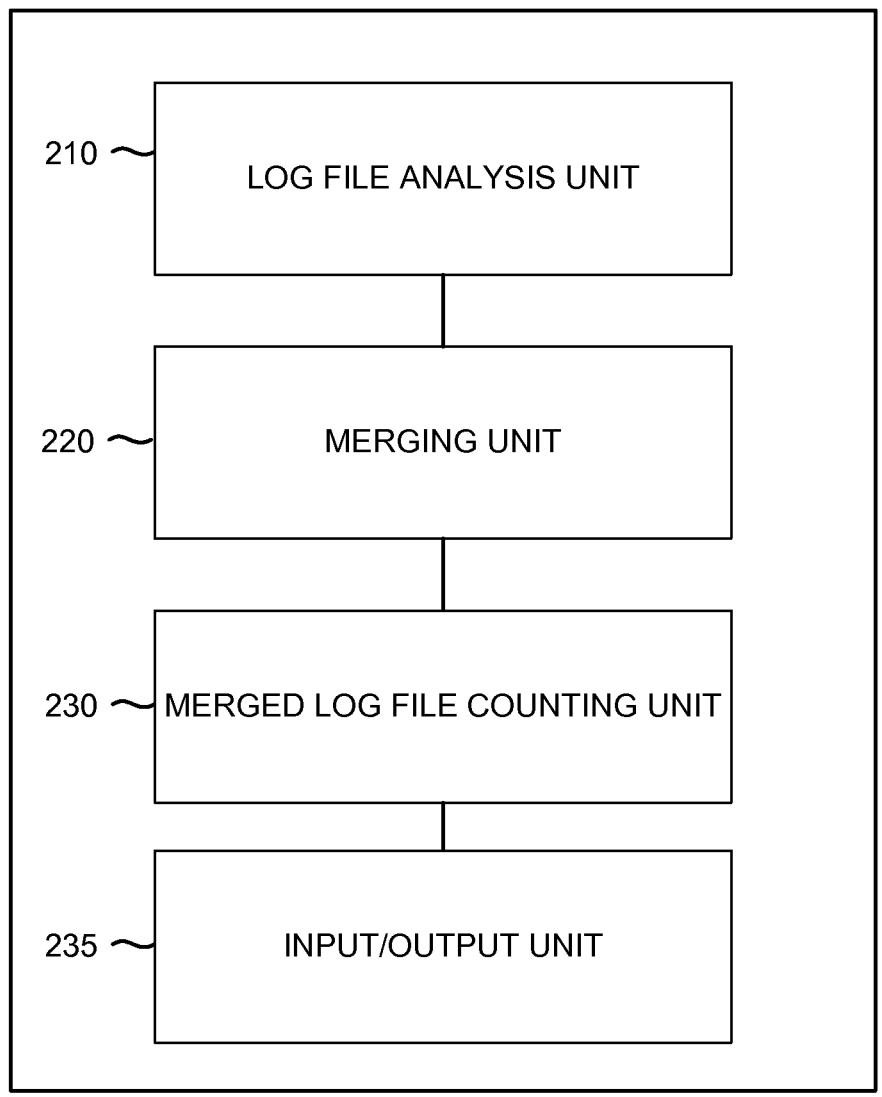
FIG. 2A is a schematic diagram illustrating an embodiment of a number of log file output points determination system.

The number of log file output points of the actual outputted log files may be determined using, without limitation, the following systems:

FIG. 2A is a schematic diagram illustrating an embodiment of a log file output points determination system configured to determine the number of log file output points. The system 200 is an implementation of the log file output point quantization unit 140. The system 200 includes a log file analysis unit 210, a merging unit 220, a merged log file counting unit 230, and an input/output unit 235.

The log file analysis unit 210 is configured to analyze content of the actual outputted log files to obtain the location information of the corresponding log file output points.

The merging unit 220 is configured to merge log files including the same location information into one merged log file.

The merged log file counting unit 230 is configured to count the total number of the log file output points of the actual outputted log files based on the total number of merged log files.

The input/output unit 235 is configured to input and output log files.

Figure 2B:
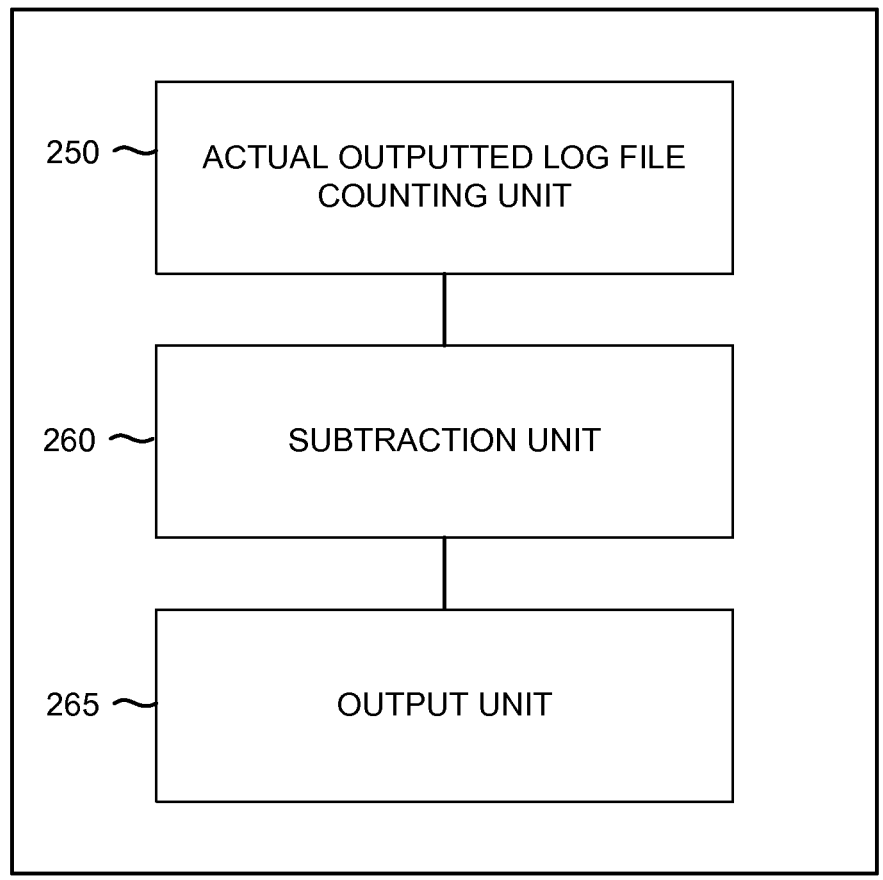
FIG. 2B is a schematic diagram illustrating another embodiment of a number of log file output points determination system.

FIG. 2B is a schematic diagram illustrating another embodiment of log file output points determination system configured to determine the number of log file output points. The system 240 is an implementation of the log file output point quantization unit 140. The system 240 includes: an actual outputted log file counting unit 250, a subtraction unit 260, and an output unit 265.

The actual outputted log file counting unit 250 is configured to count the actual number of log files outputted for each log file output point based on the location information of the corresponding each log file output point. The reason that more than one log file can be output is that the log file can form another log file after a certain size has been reached. To obtain the output with respect to a specific log file output point, all the log files outputted within a certain time can be gathered.

The subtraction unit 260 is configured to in the event that the actual number of log files outputted for each log file output point is greater than 1, subtract a value from the actual number of log files outputted to obtain the number of repetitions. The value can be 1.

The output unit 265 is configured to output a final number of log file output points of the actual outputted log files based on the number of repetitions of log files outputted.

To obtain the final number, the number of repetitions of log files is subtracted from the actual number of log files outputted to obtain a final number of log files, and the final number of log files is assigned to the final number of log file output points.

Figure 2C:
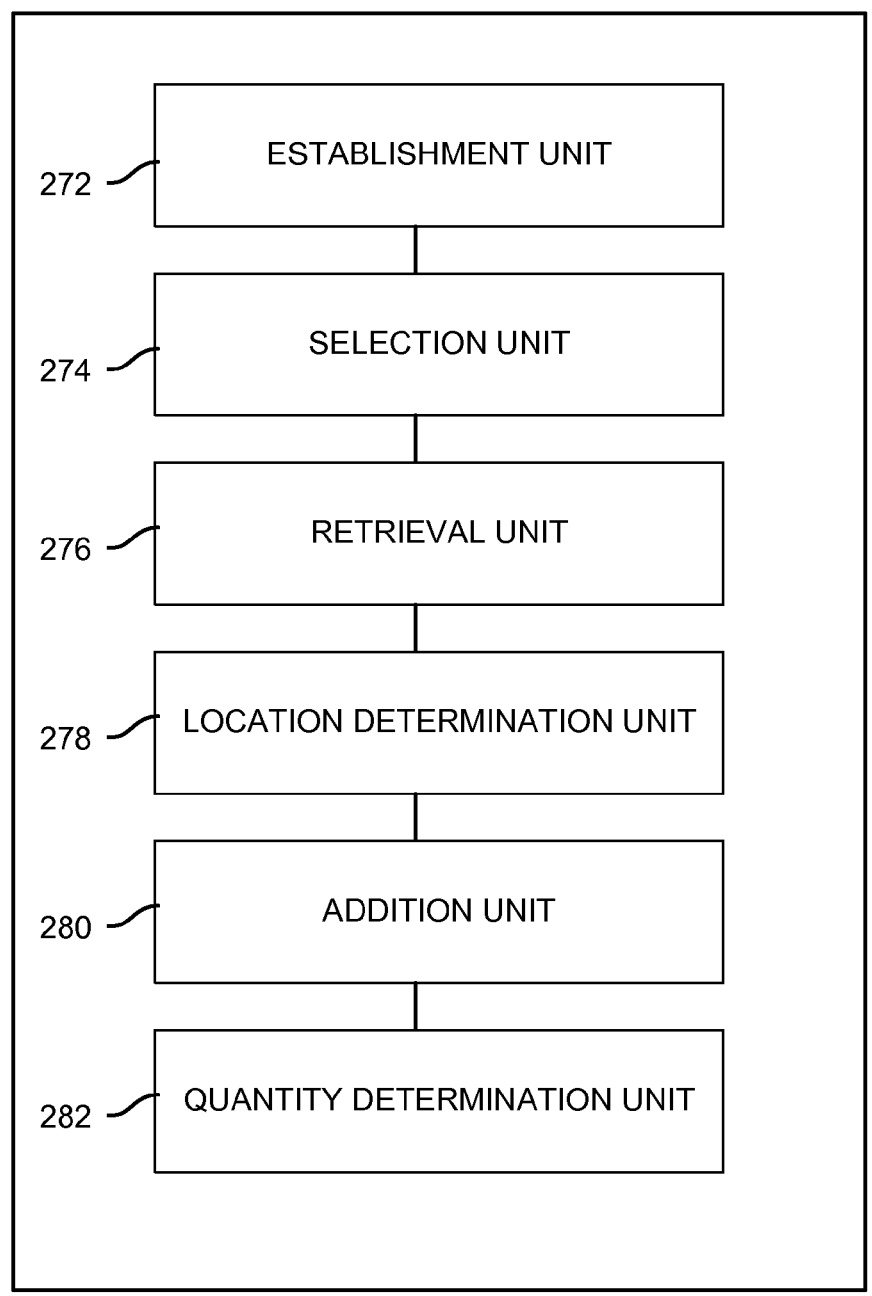
FIG. 2C is a schematic diagram illustrating yet another embodiment of a number of log file output points determination system.

FIG. 2C is a schematic diagram illustrating yet another embodiment of a number of log file output points determination system. The system 270 is an implementation of the log file output point quantization unit 140. The system 270 comprises: an establishment unit 272, a selection unit 274, a retrieval unit 276, a location determination unit 278, an addition unit 280 and a quantity determination unit 282.

The establishment unit 272 is configured to establish a quantity record list. The initial value of the quantity record list can be 0.

The selection unit 274 is configured to select an actual outputted log file.

The retrieval unit 276 is configured to retrieve the location information of the corresponding log file output point of the selected actual outputted log file.

The location determination unit 278 is configured to determine whether the location information is included in the quantity record list.

In the event that the location information is not included in the quantity record list, The addition unit 280 is configured to add the location information to the quantity record list and increment a quantity in the quantity record list by 1. The quantity determination unit 282 is configured to perform a determining operation.

The determining operation comprises determining whether any actual outputted log files remain, in the event that the actual outputted log files remain, the selection unit 274 selects another actual outputted log file, and in the event that the actual outputted log files do not remain, the quantity included in the quantity record list is assigned to be the quantity of log file output points of the actual outputted log files.

In the event that the location information is included in the quantity record list, the quantity determination unit 282 is configured to perform the above determining operation.

Figure 3:
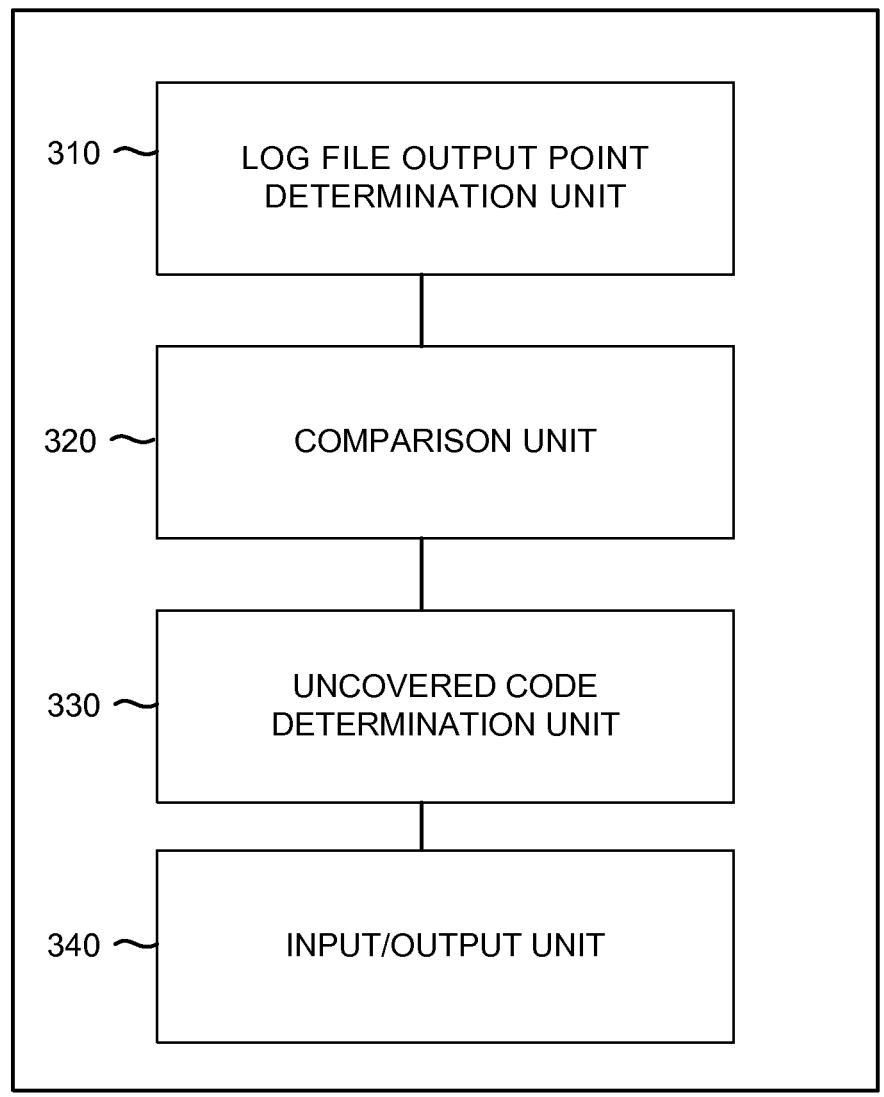
FIG. 3 is a schematic diagram illustrating another embodiment of a code coverage rate determination system.

FIG. 3 is a schematic diagram illustrating another embodiment of a code coverage rate determination system. The system 300 includes a log file output point determination unit 310, a comparison unit 320, an uncovered code determination unit 330, and an input/output unit 340.

The log file output point determination unit 310 is configured to determine log file output points of actual outputted log files in a source code based on location information in the source code of the corresponding log file output points recorded in the actual outputted log files.

The comparison unit 320 is configured to determine log file output points of un-outputted log files based on the log file output points of the actual outputted log files and theoretical log file output points. In some embodiments, the comparison unit 320 is configured to compare the actual outputted log files in different runtime environments to determine the log file output points of log files which are outputted in some runtime environments but not outputted in other runtime environments.

For example, output from two different runtime environments can be stored in a file. The file can indicate various output points and corresponding log level for the two different runtime environments. For each output point, the file can indicate whether the two different runtime environments output a log. In some embodiments, the file can indicate whether the log was output or not for each output point for each environment.

The uncovered code determination unit 330 is configured to determine code that is not covered or uncovered code based on the log file output points of the un-outputted log files.

The input/output unit 340 is configured to input and output log files.

Figure 4:
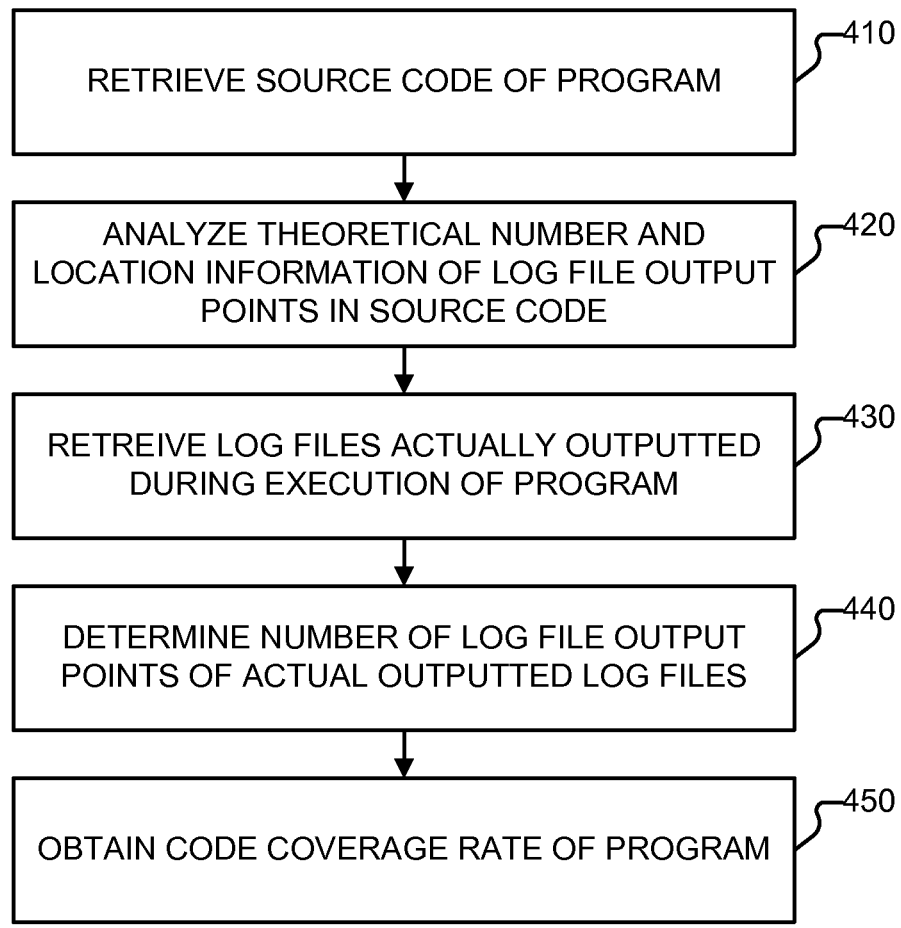
FIG. 4 is a flow chart illustrating an embodiment of a code coverage rate determination method.

FIG. 4 is a flow chart illustrating an embodiment of a code coverage rate determination method. The method 400 can be implemented on, for example, the system 100.

The code coverage rate determination method 400 includes:

In step 410, a system is configured to retrieve source code of a program.

In step 420, the system is configured to analyze theoretical number and location information of log file output points included in the source code.

Generally, in order to more easily discover and resolve actual problems during subsequent program maintenance and inspection processes, the log file output points are set up in the source code to record runtime situations of the corresponding lines of code. One log file output point usually corresponds to a number of lines of code. In the event that the lines of code are executed normally, a corresponding log file will be outputted. The log file output points are generally marked using a predetermined format. The predetermined format of the log file output points allows a scanner to analyze the source code of the program to obtain the log file output points, the location information of the log file output points in the source code, and corresponding relationships to other log file content (such as, e.g., log write records, log levels, etc.). The information obtained via the analysis facilitates the obtaining of the theoretical number of the log file output points. The theoretical number of the log file output points relates to the total number of the log file output points of outputted log files assuming that the source code of the program is executed normally.

A conventional scanning process includes scanning the entire source code with respect to the log program characteristics to determine log information included in the source code as a whole. A method such as ctag can also be used in place of a full text scan of the source code to determine log information.

In step 430, the system is configured to retrieve the log files actually outputted during the execution of the program.

In step 440, the system is configured to determine an actual number of log file output points of the actually outputted log files based on the location information of the corresponding log file output points recorded in each log file.

In the event that code configured to output a log file location is executed, a corresponding log file is outputted. By counting the log files outputted during the execution of the program, and analyzing the location information of the corresponding log file output points recorded therein, the system can count the number of log file output points in the actual outputted log files. Accordingly, it is possible to count the number of lines of code that has been executed.

The log files actually outputted during the execution of the program are generally stored in a predetermined path, and the log files can be read directly from the storage location. The path of the storage location of the outputted log files can be changed during the execution of the program or the actually outputted log files can be retrieved from a predetermined interface. In some embodiments, in order to avoid affecting the normal execution of the program, the frequency with which the program outputs log files to the code coverage rate determination system can be set. For example, the frequency with which the program outputs log files can be set to output on a half-hourly basis, on an hourly basis, or for a one-time output after the program run is complete.

In step 450, the system is configured to obtain a code coverage rate for the program based on the theoretical number of log file output points included in the source code and the number of log file output points of the actual outputted log files.

The ratio of the theoretical number of log file output points included in the source code and the number of log file output points of the actual outputted log files can correspond to the code coverage rate. Because the code coverage rate does not involve the actual number of code, the code coverage rate obtained may not correspond to the absolute numerical equivalent of the actual code coverage. As another aspect, the determining of the code coverage rate does not merely correspond to the obtaining of an absolute numerical value. Instead, one of the benefits of the code coverage rate is to aid in identifying problems that could potentially arise in the source code.

The result obtained using the code coverage rate determination method 400 does not necessarily correspond to an accurate numerical value of code coverage. The result expressed by the log files outputted therein is the certain number of lines of run code that correspond to the log file output point. Thus, the overall runtime situation of each portion of the code included in the source code is reflected accurately. For example, if no log file is outputted for a log file output point that is expected to be outputted during an actual run, this scenario indicates that a problem has occurred in the source code in this location. Even if a portion of a certain number of lines of code corresponding to the log file output point were run, the lines do not need to be considered when determining the code coverage rate, because whether the lines are considered has no effect on the identification of problems in the source code.

Figure 5A:
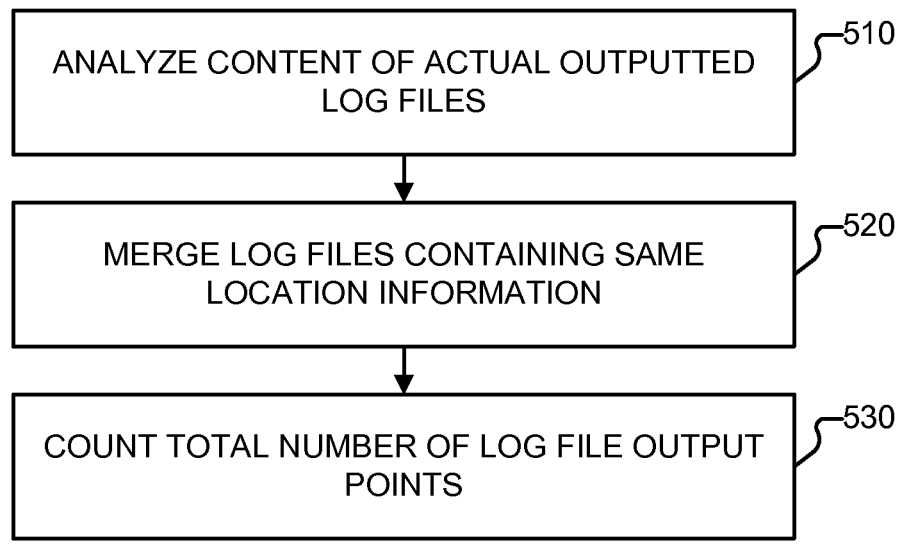
FIG. 5A is a schematic diagram illustrating an embodiment of a number of log file output points determination method.

Determination of the log file output points of the actual outputted log files can occur in a variety of ways. In the event that each log file output point only outputs one log file, the total number of actual outputted log files can correspond to the number of log file output points of the actual outputted log files. However, in actual operation, the same log file output point can be output to a plurality of log files. In order to ensure accuracy of the total number of log file output points, the repeated log files can be removed, and after removal, the number of log files is assigned to the total number of log file output points. In another example, the removal of the repeated log files can be implemented using at least the following methods:

FIG. 5A is a schematic diagram illustrating an embodiment of a number of log file output points determination method. The method 500 includes:

In step 510, the system is configured to analyze content of the actual outputted log files to obtain the location information of the corresponding log file output points recorded in the source code.

In step 520, the system is configured to merge log files including the same location information into one merged log file.

In step 530, the system is configured to determine the total number of the log file output points of the actually outputted log files by counting the total number of merged log files. The total number of merged log files corresponds to the number of log file output points of the actual outputted log files.

Figure 5B:
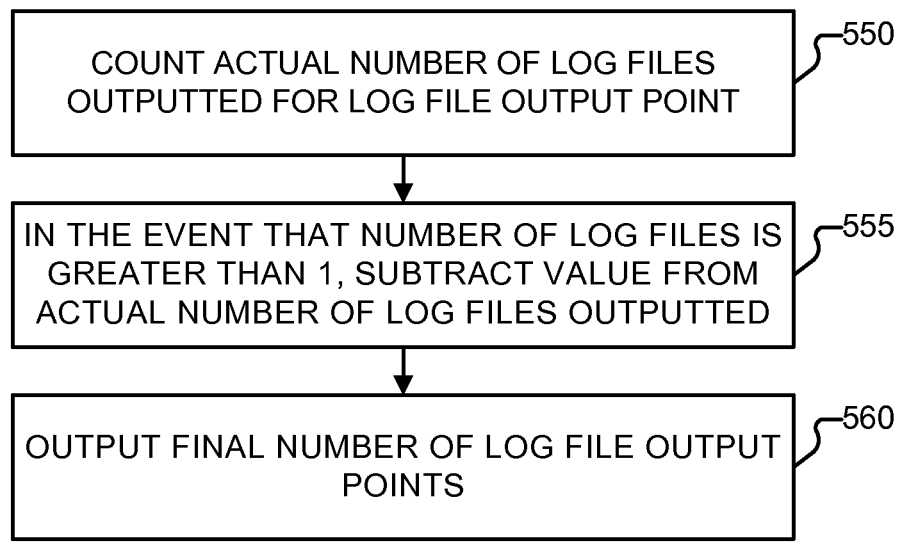
FIG. 5B is a schematic diagram illustrating another embodiment of a number of log file output points determination method.

FIG. 5B is a schematic diagram illustrating another embodiment of a number of log file output points determination method. The method 540 includes:

In step 550, the system is configured to count the actual number of log files outputted for each log file output point based on location information of the corresponding each log file output point recorded in the log files.

In step 555, in the event that the number of log files is greater than 1, the system is configured to subtract a value (e.g., 1) from the actual number of log files outputted for each log file output point to obtain the number of repetitions outputted for each log file output point.

In step 560, the system is configured to output a final number of log file output points of the actual outputted log files based on the number of repetitions of log files outputted. The total number of actual outputted log files minus the number of repetitions corresponds to the final number of log file output points of the actual outputted log files.

For example, if the total number of actually outputted log files is 200, and the actual number of log files outputted at a certain location is 10, then 10 minus 1 corresponds to the number of repetitions of 9 where each location relates to a specific log output point. Furthermore, each log file can include its location in the code so that repetitious log files can be determined with respect to a location. The number 200−9=191 is used to correspond to the number of log file output points of the actual outputted log files. In case other locations also have repetitions, the same process is repeated until all repetitions have been subtracted to obtain the final number, i.e., the number of log file output points of the actual outputted log files.

Figure 5C:
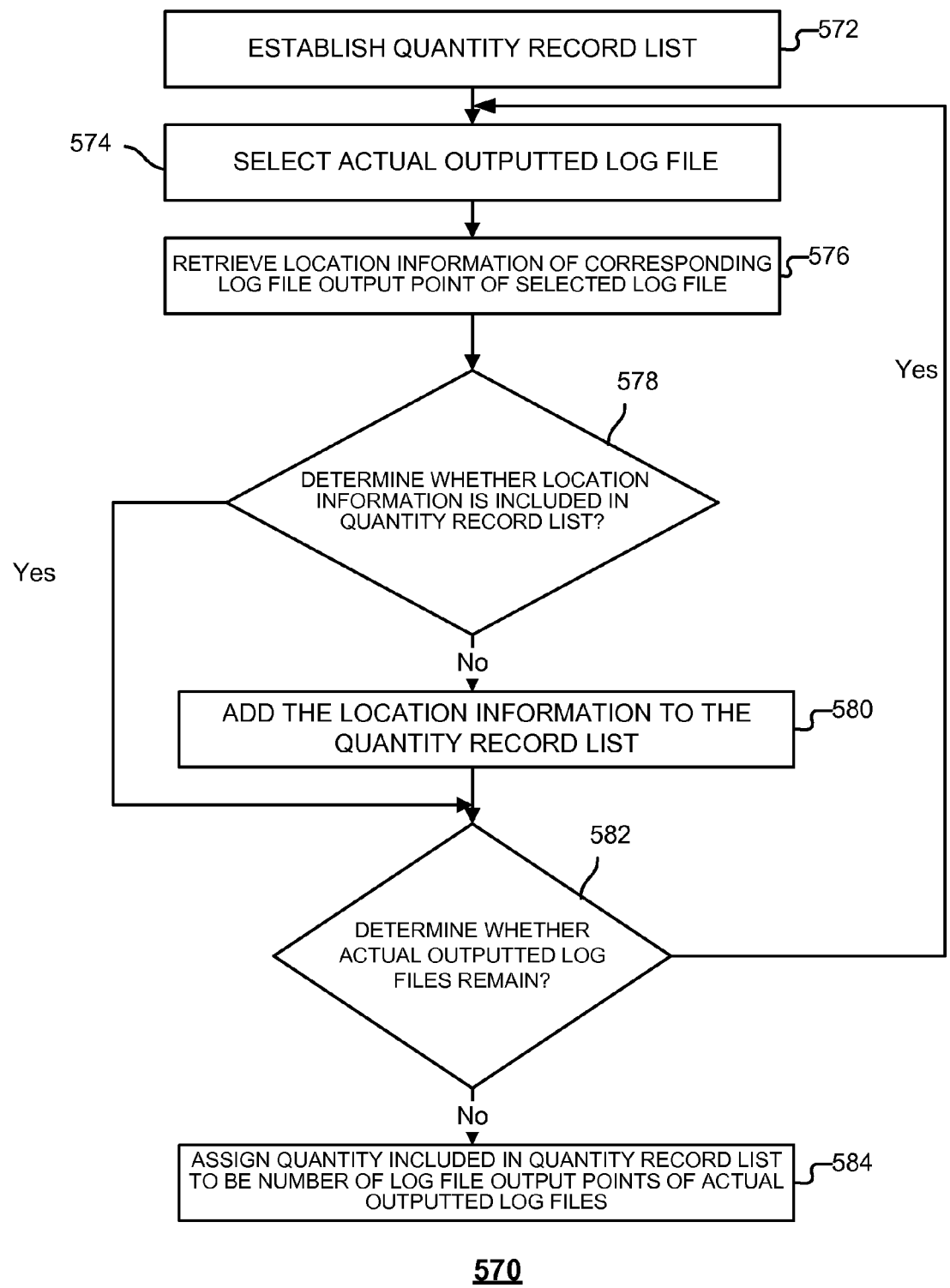
FIG. 5C is a schematic diagram illustrating yet another embodiment of a number of log file output points determination method.

FIG. 5C is a schematic diagram illustrating yet another embodiment of a number of log file output points determination method. The method 570 comprises:

In step 572, the system is configured to establish a quantity record list. The initial value of the quantity in the quantity record list can be 0.

In step 574, the system is configured to select an actual outputted log file.

In step 576, the system is configured to retrieve location information of the corresponding log file output point of the selected actual outputted log file.

In step 578, the system is configured to determine whether the location information is included in the quantity record list.

In step 580, in the event that the location information is not included in the quantity record list, the system is configured to add the location information to the quantity record list and increase the quantity by a value.

In step 582, in the event that the location information is included in the quantity record list, the system is configured to determine whether any actual outputted log files remain.

In step 584, in the event that actual outputted log files remain, the system is configure to proceed to step 574 to select another actual outputted log file.

In step 584, in the event that an actual outputted log file does not remain, the system is configure to assign the quantity included in the quantity record list to be the number of log file output points of the actual outputted log files.

One of ordinary skill in the art understands that other methods can also be used, as long as the repeated portions therein are subtracted.

Figure 6:
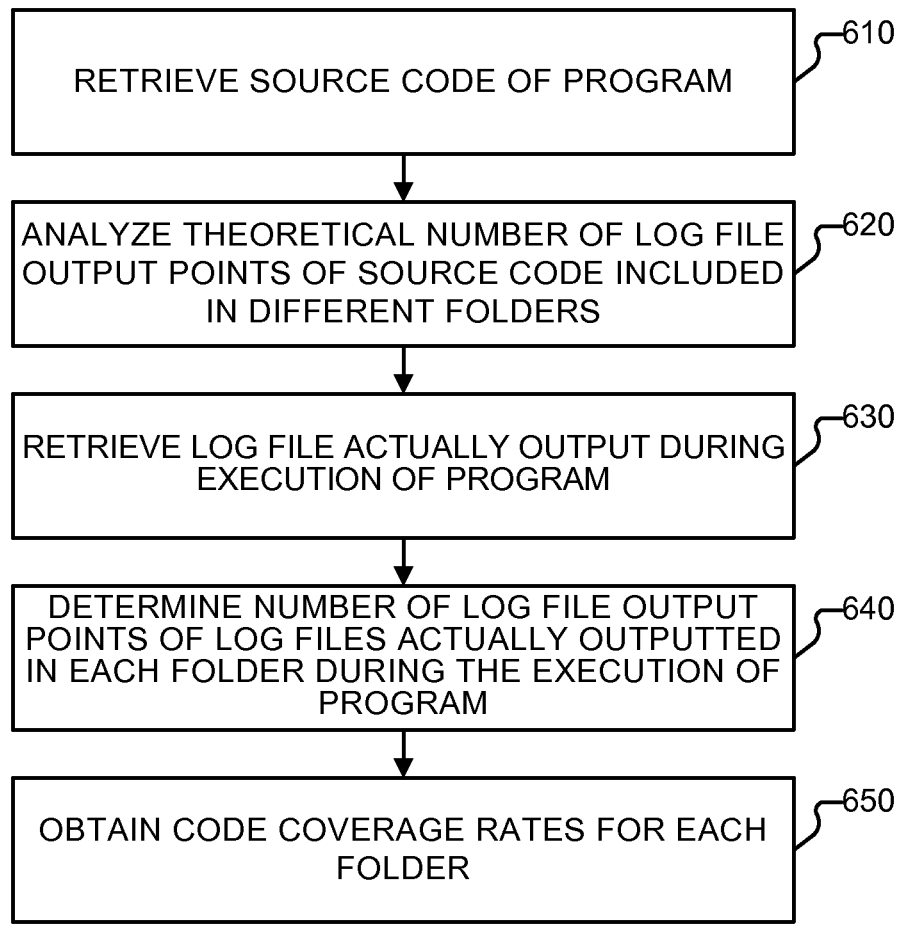
FIG. 6 is a flow chart illustrating another embodiment of the code coverage rate determination method.

FIG. 6 is a flow chart illustrating another embodiment of the code coverage rate determination method. The method 600 can be implemented on, for example, the system 100. Because one program can include a plurality of functional units, during the writing of the source code, the code corresponding to each functional unit can be placed in a different folder to facilitate searching and differentiation. Therefore, the method 600 comprises:

In step 610, a device is configured to retrieve source code of a program.

In step 620, the device is configured to analyze theoretical number of log file output points of the source code included in different locations (e.g., file folders).

In step 630, the device is configured to retrieve log files actually outputted during the execution of the program.

In step 640, the device is configured to determine the number of log file output points of the log files actually outputted in each folder during the execution of the pro gram.

In step 650, the device is configured to obtain code coverage rates for each folder based on the theoretical number of log file output points included in each folder and the number of log file output points of the actual outputted log files.

By analyzing the code coverage rates for each folder, determining where problems lie in a program's source code can be performed easier. For example, if the code coverage rate of a particular folder is determined to be 100%, and the code coverage rate of another folder is determined to be 30%, a determination can be made that problems may be present in the source code related to the latter folder. Thus, subsequent maintenance and revision of the source code can be facilitated.

In some embodiments, when the method 600 is used to determine the code coverage rate of the source code as a whole, the quantities determined in steps 410-450 for each different location (e.g. file folders) can be summed directly so that the method 600 can be implemented using the same method 400.

Additionally, the log files outputted during the execution of the program can include the following information: time, level (e.g., Fatal/Error/Warning/Info/Debug, etc.) in which file and at which line of the source code the log file output point is outputted, specific log contents, etc. By analyzing information included in the log files, a log file output situation during a particular execution of the program can be accurately obtained, and the relationship thereof to specific code in the source code can be accurately determined. For example, a log file outputted during a program run is as shown below:

```
[2011-09-21 11:44:57.009137] (time)
[WARNING]
[18316]
[build/debug64/component/sub_path/file.cpp:1181]
___TARGET_ID___:sys/component
PROFILING:Tubo start the fuxi work item:1316576697
```

As shown in the above example, the time of this log file is "2011-09-21 11:44:57.009137", the level is "WARNING", and the location in the source code of the corresponding log file output point is "build/debug64/component/sub path/file.cpp:1181". Therefore, the method 600 can also implement code coverage detection based on the information included in the log files to determine the extent of code coverage of a particular program in a runtime environment.

Figure 7:
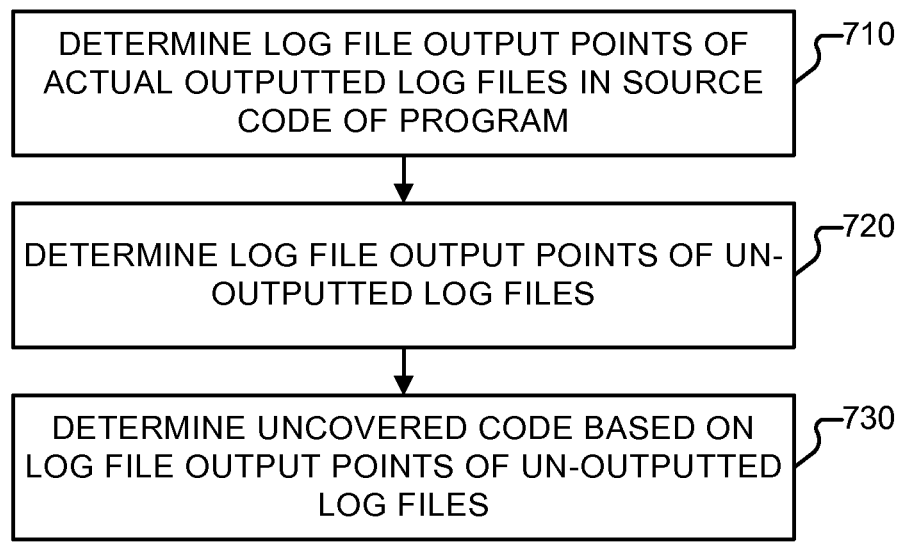
FIG. 7 is a flow chart illustrating an embodiment of a code coverage detection method.

FIG. 7 is a flow chart illustrating an embodiment of a code coverage detection method. The method 700 can be implemented on, for example, system 300. The method 700 comprises:

In step 710, a device is configured to determine log file output points of actual outputted log files in a source code of a program based on location information in the source code of the corresponding log file output points recorded in the actual outputted log files.

In step 720, the device is configured to determine log file output points of un-outputted log files based on the log file output points of the actual outputted log files and theoretical log file output points.

In step 730, the device is configured to determine uncovered code based on the log file output points of the un-outputted log files.

Because the location information in the source code of the corresponding log file output points is recorded in the log files, the device can determine locations of the log file output points that correspond to the run code of the source code by comparing the log file output points against the theoretical log file output points. Thus, the log file output points of the un-outputted log files can be determined, and thereby the code which is not covered can also be determined.

In one example, a program can be tested in different runtime environments to simulate the program's actual runtime environment as much as possible and to test the program from a plurality of angles. For example, unit testing, integration testing, production environments, etc. correspond to different runtime environments. In different runtime environments, code coverage rates may not be entirely the same. In other words, the actual outputted log files may not be the same in the different runtime environments.

Figure 8:
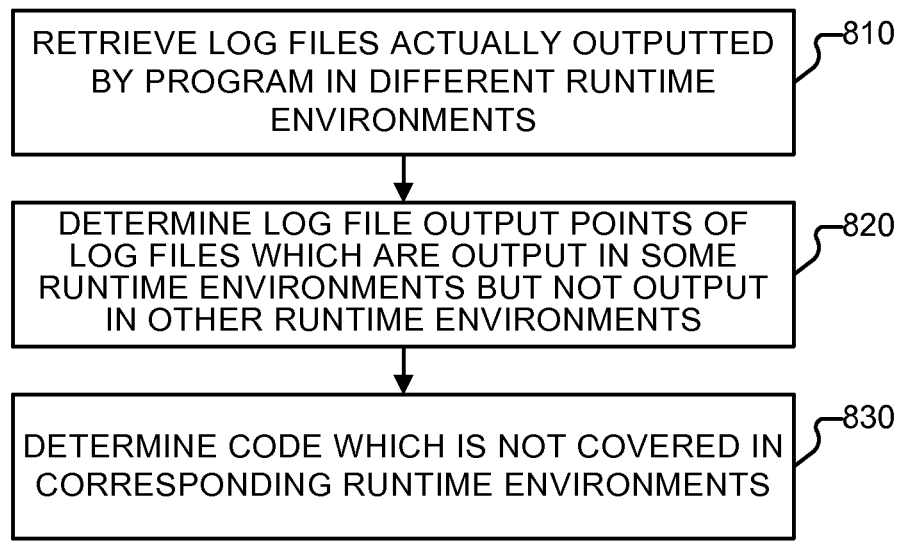
FIG. 8 is a flowchart illustrating another embodiment of a code coverage detection method.

FIG. 8 is a flowchart illustrating another embodiment of a code coverage detection method. The method 800 can be implemented on, for example, the system 300. The method 800 can be used to compare code coverage in different runtime environments, and comprises:

In step 810, a device is configured to retrieve log files actually outputted by a program in different runtime environments.

In step 820, the device is configured to determine log file output points of the log files which are output in one or more runtime environments but not output in other runtime environments based on location information in the source code of the corresponding log file output points recorded in the log files actually outputted in each runtime environment.

In step 830, the device is configured to determine code which is not covered in the corresponding runtime environments based on the log file output points of un-outputted log files.

In the event that source code location of a certain log file output point is not recorded in log files of all runtime environments, the source code location of the certain log file output point not being recorded in the log files indicates the log files were not outputted for the log file output point corresponding to the source code location in certain environments. Thus, a determination can be made that uncovered code exists in the environment corresponding to the log file that is not recorded. For example, three different runtime environments of a program include a unit testing environment, an integration testing environment, and a production environment. By comparing the records included in the log files of the three runtime environments, in the event that corresponding log files are discovered for the unit testing environment and the integration testing environment and no log files is discovered for the production environment, this scenario indicates that some of the code covered in the unit testing environment and the integration testing environment is not covered in the production environment. Therefore, by comparing the information recorded in the log files, uncovered code can be found quickly, thereby facilitating subsequent revision and maintenance of the program.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A code coverage rate determination method, comprising:

retrieving source code of a program;

prior to executing the program, determining a theoretical number of log file output points included in the source code and location information of the log file output points included in the source code, wherein each log file output point corresponds to at least one line of code, and each log file output point outputs at least one log file when executed;

executing the program;

retrieving log files actually outputted during the execution of the program, wherein each log file comprises location information of its corresponding log file output point;

determining, using one or more processors, an actual number of log file output points of the actually outputted log files based on the location information of the corresponding log file output points recorded in each log file, the determining comprising:

a) analyzing content of the actually outputted log files to obtain the location information of the corresponding log file output points, wherein the actually outputted log files were generated during the same execution of the program;

merging log files containing the same location information into one merged log file in the event that more than one log file contains the same location information, wherein a merged log file corresponds to a log file output point; and counting a final number of the log file output points of the actually outputted log files based on a total number of merged log files; or b) counting an actual number of log files outputted for each log file output point based on the location information of the corresponding each log file output point contained in each log file, wherein the actually outputted log files were generated during the same execution of the program;

for each log file output point where the actual number of log files outputted is greater than 1, subtracting a value 1 from the actual number of log files outputted for each log file output point to obtain a number of repetitions outputted by each log file output point; and subtracting the number of repetitions outputted by each log file output point from a total number of actually outputted log files to obtain a final number of log file output points of the actually outputted log files; and determining, using the one or more processors, a code coverage rate of the program based on the theoretical number of log file output points included in the source code and the final number of the log file output points of the actually outputted log files.

2. The code coverage rate determination method as described in claim 1, wherein the determining of the number of log file output points comprises:

S1: establishing a quantity record list;
S2: selecting an actually outputted log file:
S3: retrieving the location information of the corresponding log file output points of the selected actually outputted log file;
S4: determining whether the location information is included in the quantity record list;
S5: in the event that the location information is not included in the quantity record list:
  adding the location information to the quantity record list;
  increasing a quantity of the quantity record list; and
  proceeding to step S7;
S6: in the event that the location information is included in the quantity record list, proceeding to step S7; and
S7: determining whether an actually outputted log file remains;
S8: in the event that the actually outputted log file remains, proceeding to step S2;
S9: in the event that the actually outputted log file does not remain, assigning the quantity included in the quantity record list to be the number of log file output points of the actually outputted log files.

3. The code coverage rate determination method as described in claim 1, wherein the retrieving of the log files actually outputted during the execution of the program comprises reading the actually outputted log files from a predetermined storage location or retrieving the actually outputted log files transmitted by the program from a predetermined interface.

4. The code coverage rate determination method as described in claim 1, wherein the determining of the theoretical number of the log file output points included in the source code comprises:

analyzing the theoretical number of log file output points of the source code included in different folders, wherein the number of log file output points of log files actually outputted during the execution of the program corresponds to the number of log file output points of actually outputted log files included in the different folders.

5. A code coverage rate determination system, comprising:
at least one processor configured to
  retrieve source code of a program;
  prior to executing the program, determine a theoretical number of log file output points included in the source code and location information of the log file output points included in the source code, wherein each log file output point corresponds to at least one line of code, and each log file output point outputs at least one log file when executed;
  execute the program;
  retrieve log files actually outputted during the execution of the program, wherein each log file comprises location information of its corresponding log file output point;
  determine an actual number of log file output points of the actually outputted log files based on the location information of the corresponding log file output points recorded in each log file, the determining comprising:

a) analyze content of the actually outputted log files to obtain the location information of the corresponding log file output points, wherein the actually outputted log files were generated during the same execution of the program;

merge log files containing the same location information into one merged log file in the event that more than one log file contains the same location information, wherein a merged log file corresponds to a log file output point; and count a final number of the log file output points of the actually outputted log files based on a total number of merged log files; or b) count an actual number of log files outputted for each log file output point based on the location information of the corresponding each log file output point contained in each log file, wherein the actually outputted log files were generated during the same execution of the program;

for each log file output point where the actual number of log files outputted is greater than 1, subtract a value 1 from the actual number of log files outputted for each log file output point to obtain a number of repetitions outputted by each log file output point; and subtract the number of repetitions outputted by each log file output point from a total number of actually outputted log files to obtain a final number of log file output points of the actually outputted log files; and determine a code coverage rate of the program based on the theoretical number of log file output points included in the source code and the final number of the log file output points of the actually outputted log files; and a memory coupled to the at least one processor and configured to provide the at least one processor with instructions.

6. The code coverage rate determination system as described in claim 5, wherein the retrieve of the log files actually outputted during the execution of the program comprises read the actually outputted log files from a predetermined storage location or retrieve the actually outputted log files transmitted by the program from a predetermined interface.

7. A computer program for determining a code coverage rate, the computer program product being embodied in a non-transitory computer readable storage medium and comprising computer instructions for:
retrieving source code of a program;
prior to executing the program, determining a theoretical number of log file output points included in the source code and location information of the log file output points included in the source code, wherein each log file output point corresponds to at least one line of code, and each log file output point outputs at least one log file when executed;
executing the program;
retrieving log files actually outputted during the execution of the program, wherein each log file comprises location information of its corresponding log file output point;
determining an actual number of log file output points of the actually outputted log files based on the location information of the corresponding log file output points recorded in each log file, the determining comprising:
a) analyzing content of the actually outputted log files to obtain the location information of the corresponding log file output points, wherein the actually outputted log files were generated during the same execution of the program;
merging log files containing the same location information into one merged log file in the event that more than one log file contains the same location information, wherein a merged log file corresponds to a log file output point; and
counting a final number of the log file output points of the actually outputted log files based on a total number of merged log files; or
b) counting an actual number of log files outputted for each log file output point based on the location information of the corresponding each log file output point contained in each log file, wherein the actually outputted log files were generated during the same execution of the program;
for each log file output point where the actual number of log files outputted is greater than 1, subtracting a value 1 from the actual number of log files outputted for each log file output point to obtain a number of repetitions outputted by each log file output point; and
subtracting the number of repetitions outputted by each log file output point from a total number of actually outputted log files to obtain a final number of log file output points of the actually outputted log files; and
determining a code coverage rate of the program based on the theoretical number of log file output points included in the source code and the final number of the log file output points of the actually outputted log files.

8. The computer program product as described in claim 7, wherein the determining of the number of log file output points comprises:
S1: establishing a quantity record list;
S2: selecting an actually outputted log file:
S3: retrieving the location information of the corresponding log file output points of the selected actually outputted log file;
S4: determining whether the location information is included in the quantity record list;
S5: in the event that the location information is not included in the quantity record list:
adding the location information to the quantity record list;
increasing a quantity of the quantity record list; and proceeding to step S7;
S6: in the event that the location information is included in the quantity record list, proceeding to step S7; and
S7: determining whether an actually outputted log file remains;
S8: in the event that the actually outputted log file remains, proceeding to step S2;
S9: in the event that the actually outputted log file does not remain, assigning the quantity included in the quantity record list to be the number of log file output points of the actually outputted log files.

9. The computer program product as described in claim 7, wherein the retrieving of the log files actually outputted during the execution of the program comprises reading the actually outputted log files from a predetermined storage location or retrieving the actually output log files transmitted by the program from a predetermined interface.

10. The computer program product as described in claim 7, wherein the analyzing of the theoretical number of the log file output points included in the source code comprises:
analyzing the theoretical number of log file output points of the source code included in different folders, wherein the number of log file output points of log files actually outputted during the running of the program corresponds to the number of log file output points of actually outputted log files included in each folder.

* * * * *